United States Patent
Faulkner et al.

(10) Patent No.: US 9,923,858 B2
(45) Date of Patent: Mar. 20, 2018

(54) ELECTRONICALLY PROCESSING BOUNCEBACK MESSAGES FROM COMMUNICATIONS NETWORKS

(71) Applicant: Branch Baking and Trust Company, Winston-Salem, NC (US)

(72) Inventors: Deborah Taylor Faulkner, Rolesville, NC (US); Judith Ann Collin, Raleigh, NC (US); James Nathan Schwartz, Wake Forest, NC (US)

(73) Assignee: Branch Banking and Trust Company, Winston-Salem, NC (US)

( * ) Notice: Subject to any disclaimer, the term of this patent is extended or adjusted under 35 U.S.C. 154(b) by 178 days.

(21) Appl. No.: 14/530,191

(22) Filed: Oct. 31, 2014

(65) Prior Publication Data
US 2016/0127277 A1 May 5, 2016

(51) Int. Cl.
*G06F 15/16* (2006.01)
*H04L 12/58* (2006.01)

(52) U.S. Cl.
CPC .................................. *H04L 51/30* (2013.01)

(58) Field of Classification Search
CPC ....................................................... H04L 51/30
USPC .................................................. 709/206, 204
See application file for complete search history.

(56) References Cited

U.S. PATENT DOCUMENTS

| | | | |
|---|---|---|---|
| 8,103,627 B1* | 1/2012 | Qiu | H04L 12/585 707/613 |
| 2005/0265319 A1* | 12/2005 | Clegg | H04L 12/5875 370/352 |
| 2011/0289162 A1* | 11/2011 | Furlong | H04L 12/585 709/206 |
| 2015/0019910 A1* | 1/2015 | Simon | G06F 11/1402 714/16 |

* cited by examiner

*Primary Examiner* — Joseph E Avellino
*Assistant Examiner* — Marshall McLeod
(74) *Attorney, Agent, or Firm* — Kilpatrick Townsend & Stockton LLP

(57) ABSTRACT

Examples of systems and methods for processing email bounceback messages are disclosed. One disclosed method includes the steps of receiving a bounceback email message, determining a classification for the bounceback email message, determining a corrective action for the bounceback email message based on the classification, and executing the corrective action. In another example, program code for performing such a method is encoded on a non-transitory computer-readable media.

23 Claims, 9 Drawing Sheets

Delivery has failed to these recipients or distribution lists:

jsmith@email-domain.com —— 312

An error occurred while trying to deliver this message to the recipient's e-mail address.

The email server will not try to redeliver this message for you. Please try resending this message, or provide the following diagnostic text to your system administrator.
　　　　　　　　　　　　　　　　　　　　　314

The following organization rejected your message: service39-us.mimecast.com.

Generating server: mail.company.com jsmith@email-domain.com
550 Invalid Recipient —— 318
　316
Original message headers:

Received: from mail.company.com (10.100.12.90) by
mail2.company.com (10.100.12.41) with Generic SMTP Server
id 8.2.176.0; Tue, 17 Jun 2014 09:18:02 -0400
Received: from mail01.company.com ([fe70::5cef:6da9:63a6:affe])
by mail2.company.com ([::1]) with mapi id 12.14.0643.103; Tue, 17 Jun 2014 09:18:02 -0400
From: "Doe, John" <jdoe@generic-domain.com>
To: Joe Smith <jsmith@email-domain.com>

```
MIME-Version: 1.0
From: Microsoft Outlook —— 322
To: <jdoe@generic-domain.com>
       <MicrosoftExchange329e71e15bbc36ce41109e@email-domain.com> —— 324
Date: Tue, 17 Jul 2014 09:18:02 -0400
Content-Type: multipart/report; report-type=delivery-status;
       boundary="881827e-8214-429d-a6b7-d6bbe703f8"
X-MS-Exchange-Organization-SCL: -1
Content-Language: en-US
Message-ID: <99e26b53-8b22-4049-8d0d-b73007376e77@mail.company.com>
In-Reply-To: <EA822942A0D8F947AEACFAEB33DFDC7955145758@mail01.company.com>
Thread-Topic: Acme Budget
Thread-Index: Ac+h4VhfD1mdkCkASuuAAKbvTcAAFkVhwAAK/c2AAAAJnGg==
Subject: Undeliverable: RE: Acme Budget —— 326
X-MS-Exchange-Organization-AuthSource: mail.company.com
X-MS-Exchange-Organization-AuthAs: External
X-MS-Exchange-Organization-AuthMechanism: 0A
```
— 320

Figure 5

ELECTRONICALLY PROCESSING BOUNCEBACK MESSAGES FROM COMMUNICATIONS NETWORKS

FIELD

The present disclosure generally relates to electronically processing bounceback messages, and more specifically relates to electronically processing bounceback messages from communications networks.

BACKGROUND

Electronic mail (commonly referred to as "email") is a ubiquitous medium used to communicate messages, documents, and other information between different people. Like traditional postal mail, a user has an email "address" to which communications may be directed, and from which emails may be sent. Emails include within them this address information, as well as the content intended to be communicated to the recipient, whether a short informal note, a business proposal, multimedia content (e.g., pictures and Uniform Resource Locators (URLs)), or myriad other information. When a user composes and then sends an email, the user's computer communicates with software to enable the transmission of the email to the identified recipient(s). In some cases, delivery of an email may be delayed or may fail due to network congestion, problems with one or more email servers, or an incorrectly-entered email address. Such a delay or failure can cause an automated response message to be sent to the sender to indicate the delay or failure.

SUMMARY

Examples of systems and methods for processing email bounceback messages are disclosed. One disclosed method includes the steps of receiving a bounceback email message, determining a classification for the bounceback email message, determining a corrective action for the bounceback email message based on the classification, and executing the corrective action. In another example, program code for performing such a method is encoded on a non-transitory computer-readable media.

These illustrative examples are mentioned not to limit or define the invention, but rather to provide examples to aid understanding thereof. Illustrative examples are discussed in the Detailed Description, which provides further description of the invention. Advantages offered by various examples of this invention may be further understood by examining this specification.

BRIEF DESCRIPTION OF THE DRAWINGS

The accompanying drawings, which are incorporated into and constitute a part of this specification, illustrate one or more examples and, together with the description of examples, serve to explain the principles and implementations of the examples.

FIGS. 4-7 show examples of bounceback messages according to certain aspects.

DETAILED DESCRIPTION

Figure 1:
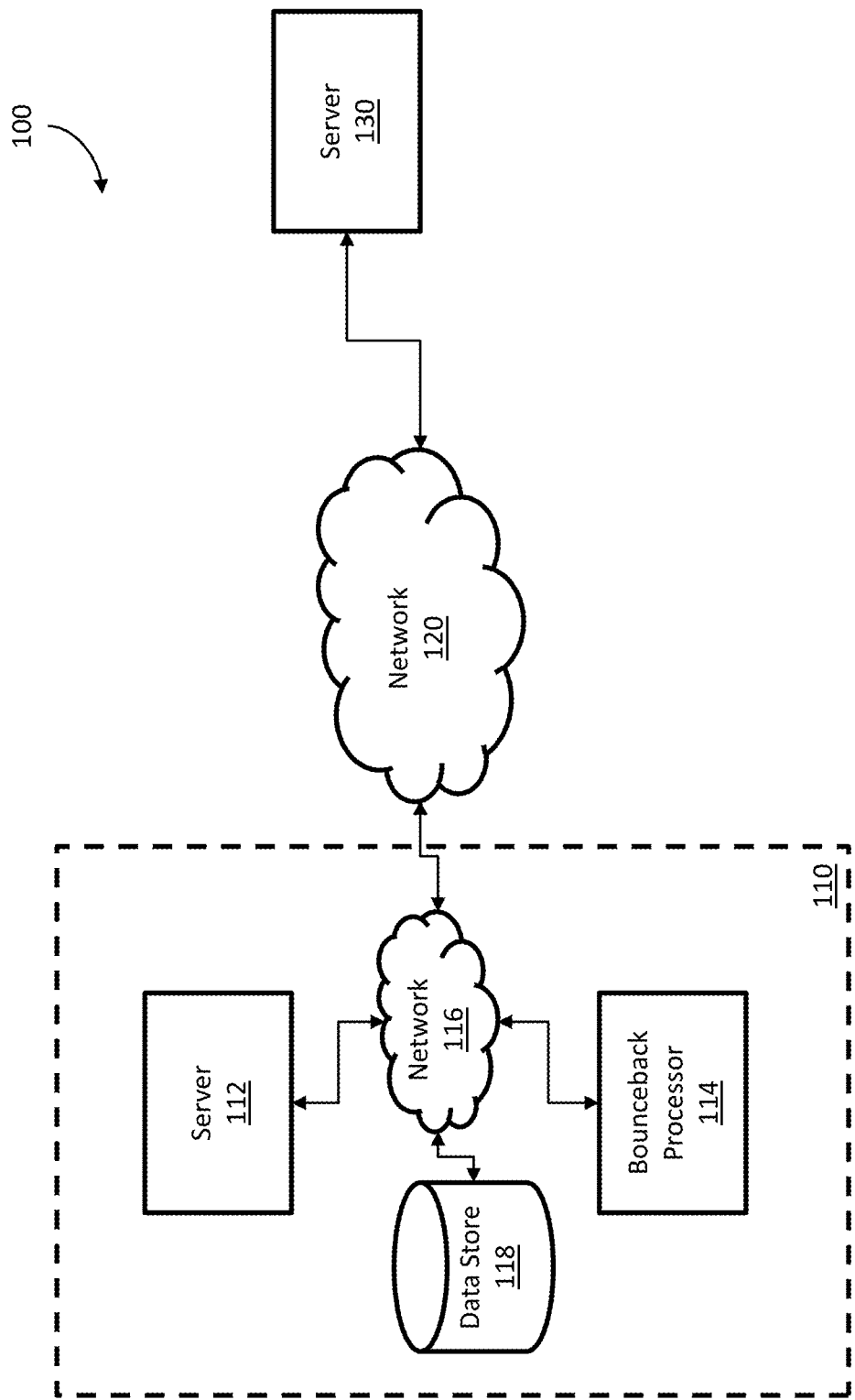
FIGS. 1-2 show examples of systems for processing email bounceback messages according to certain aspects.

Examples are described herein in the context of systems and methods for processing email bounceback messages. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any actual implementation, numerous implementation-specific decisions must be made in order to achieve the developer's specific goals, such as compliance with application- and business-related constraints, and that these specific goals will vary from one implementation to another and from one developer to another.

Illustrative Method for Processing Email Bounceback Messages

Email communications can be used for many purposes, but sometimes they are used to send notifications to customers of a company. For example, if the company is a bank or other financial institutions, the notifications may include bank statements, alert information about a customer's account (e.g., an overdraft notification), or marketing information. To allow the bank to send these email notifications, one or more of its customers may provide email addresses for the bank to use. However, there may be times when the bank attempts to send an email to a customer at the provided email address, and the email is not delivered due to some issue. These failures can be temporary or permanent. For example, a temporary failure may occur when a user's email inbox is full and cannot accept more email messages until some messages have been deleted. In such a case, the email may ultimately be delivered after some delay. A permanent failure may occur if the customer incorrectly entered his email address or if the customer deletes the email address. And in some cases, a temporary failure may become a permanent failure. For example, if the user does not delete enough emails from his inbox, the server attempting to deliver the email may give up after a period of time. When these failures occur, the sender of the email may receive a notification indicating that a delivery failure, whether temporary or permanent, has occurred. The notification may also include information that indicates the type of failure.

For example, in some cases, an intended recipient may be away on vacation. In such a case, the recipient may set their email account to automatically send a reply to newly-received email messages to let the sender know the recipient is away. This type of message is frequently referred to as an "out of office" message. In some cases, the user's email account may only allow a certain number of messages in the email inbox, such as 100 emails, after which new emails are rejected. In such a case, the email server responsible for the user's email account may send a response email to the sender indicating that the recipient's email inbox is full and that the email message was not delivered. Other types of automatic responses are possible too.

In some cases, the sender may wish to take corrective action when email delivery failures occur. However, the type of corrective action may vary depending on the type of failure and the circumstances of the failure. To determine the type of failure, the sender may examine a response email to identify a numeric code or to analyze text information within the response email. After determining the type of failure, the sender can take a corrective action. For example, if the sender sends an email to a customer, and receives a notification indicating that the email address is invalid, the sender may wish to stop sending email notifications to that email address. However, if the sender sends an email to a customer, and receives a notification that the customer is away on vacation, the sender may ignore the notification and continue sending emails to the customer. In other cases, though, such as if the customer's inbox is full, the sender may wish to suspend sending of any additional messages for a period of time to allow the user to make room for new messages.

In some cases, delivery failures may be due to a networking or server problem within a domain. In such a case, emails sent to the domain may not be delivered, despite the email addresses being valid. In such a case, the system may track delivery failures at the domain level, in addition to the email address level. And a delivery failure to a domain may be addressed by a temporary suspension of email messages to the domain. Because a large number of emails may be sent to the domain, by temporarily suspending a domain address, the email system may substantially reduce network usage, both due to fewer outbound emails and due to inbound delivery failure messages. Further, in cases where delivery failures to a domain may be failing due to the domain flagging the sender for a blacklist as a potential email spam sender, particularly in cases where a significant number of emails are sent to email addresses at the domain, a temporary suspension may help alleviate the potential blacklisting by reducing an amount of email traffic, or provide an opportunity for an administrator of the sender's emails to contact the domain to resolve the blacklisting issue.

These are some of the many types of email delivery failures that may occur and some examples of corrective action that can be taken when a delivery failure occurs. Depending on the type of response message, corrective actions may be more intricate and may depend on policies or requirements imposed on the company. For example, a sender may have an obligation to provide certain information to its customers. If the sender attempts to send an email to a customer, but the customer has provided an invalid email address, the sender may still be obligated to communicate the information to the customer. Thus, in some cases, corrective action may include steps other than suspending an email address, such as calling the customer, sending the customer a text message, or contacting a domain associated with the email address.

Referring now to FIG. 1, FIG. 1 shows an example system 100 for processing email bounceback messages. In this example, the system 100 includes an internal email system 110, which includes an email server 112, a bounceback processor 114, an internal communications network 116, and a data store 118. The system 100 communicates with an external email server 130 through an external network 120. In this example, the email server 112, bounceback processor 114, and data store 118 communicate with each other through the internal communications network 116.

In the example shown in FIG. 1, the email server 112 is a processor-based device having one or more electronic processors, one or more tangible computer-readable media in communication with the one or more electronic processors, and one or more network interfaces. The email server 112 can execute program code to enable the email server 112 to receive, store, process, and transmit email messages. In some examples, the email server 112 may include multiple processor-based devices that communicate with each other and collectively, or each individually, receive, store, process, and transmit email messages.

Figure 2:
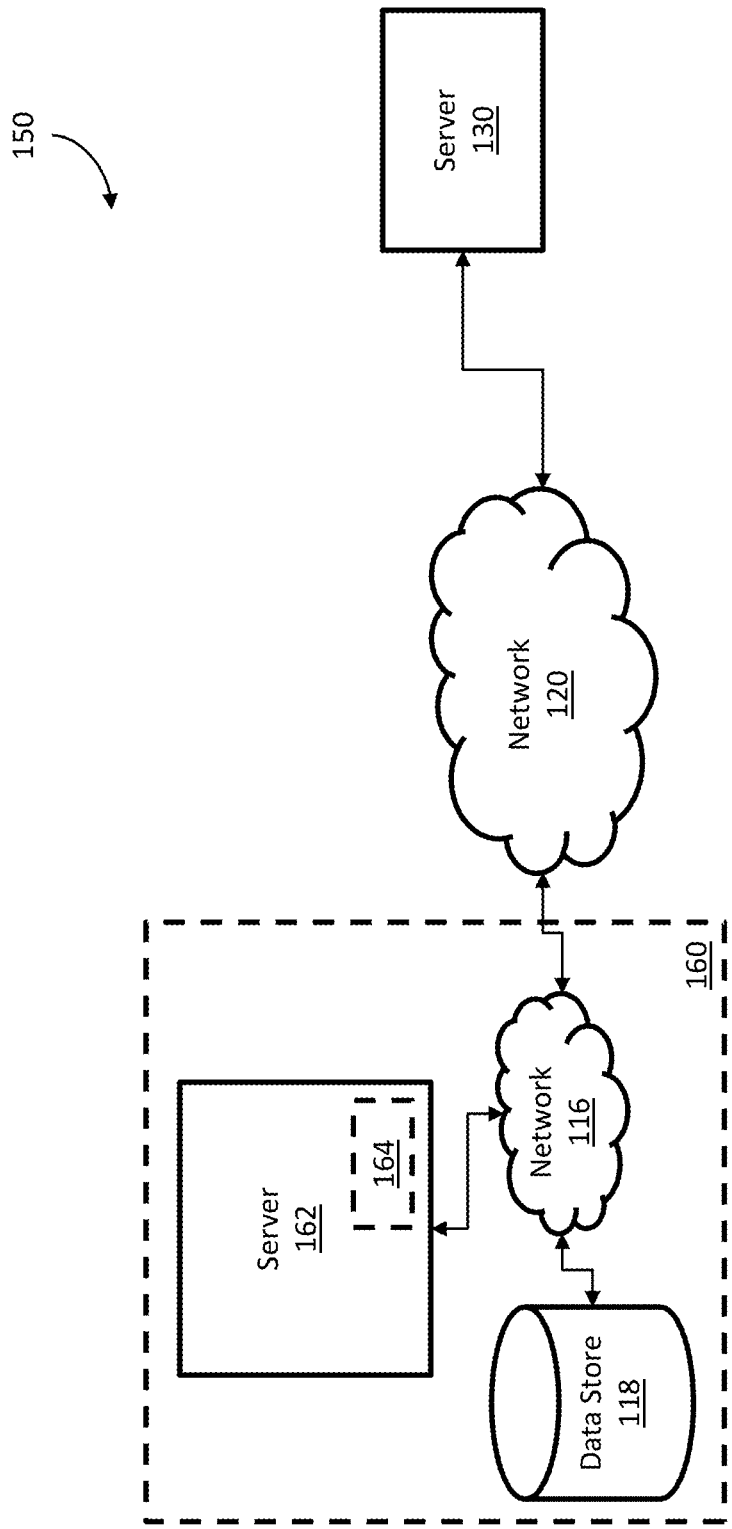

The bounceback processor 114 in this example also includes a processor-based device having one or more electronic processors, one or more tangible computer-readable media in communication with the one or more electronic processors, and one or more network interfaces, and receives and processes information associated with email bounceback messages. For example, the bounceback processor 114 may receive and process bounceback messages received from one or more email servers, such as external email server 130 or from email server 112. In one example, email messages received from external sources and destined for email addresses inside of the company's internal email system 110 may be received by the email server 112. If the email server 112 determines that a received email message is an email bounceback message, the email server 112 may transmit a copy of the email bounceback message to the bounceback processor 114. In one example, the company's internal email system 110 may automatically route email bounceback messages to the bounceback processor 114 instead of the email server 112. Further, in some examples, the email server 112 may include the bounceback processor 114. Referring to FIG. 2, which shows an example system 150 for processing email bounceback messages, the internal email system 160 includes an email server 162 similar to the one 112 shown in FIG. 1, but the email server 162 includes the bounceback processor 164.

Referring again to FIG. 1, the data store 118 in this example includes an electronic processor-based device having one or more tangible computer-readable media that store one or more email messages and information associated with the one or more email messages. In some examples, data store 118 may store data regarding one or more customers, including one or more email addresses associated with the customers. And while the data store 118 shown in FIG. 1 includes a single electronic processor-based device, some example data stores 118 may include multiple processor-based devices, each having, or having access to, one or more tangible computer-readable media configured to store one or more email messages and information associated with the one or more email messages. And in some examples, the data store 118 executes database software for accessing and storing email messages and associated information.

As described above, the company's email server 112 receives, stores, processes, and transmits email messages to email addresses both within the company's system 110 as well as outside of the company's system 110. In this example, when the email server 112 receives an email message, it communicates with the data store 118 to store the email message. It also examines information within the email message to identify a destination email address associated with the email message. If the email message is destined for an email address within the company's internal email system 110, the email server 112 may provide the email message to an email inbox associated with the destination email address. If the email message is destined for an email address outside the company, the email server 112 may transmit the email outside the company, such as to the external email server 130 by sending the email message into the external network 120. The external network 120 may then facilitate transmission and delivery of the email message from the email server 112 to the external email server 130.

In the example shown in FIG. 1, the external network 120 may include one or more networks. For example, the external network 120 may include the Internet. In some examples, the external network 120 includes a communications network provided by an internet service provider (ISP) or a wireless network, such as a cellular or WiFi network, and may include wireless or wireline networks.

In the example shown in FIG. 1, the external email server 130 is a server providing email functionality to a domain, represented by domain name and a three-letter top-level domain ("TLD"), separated by a '.' character, e.g., "company.com." A domain may refer to a collection of computers or email addresses having a common address component. For example, multiple email addresses for the domain "company.com" may all end with "@company.com" to indicate an association with the "company.com" domain.

Referring again to FIG. 1, after the company's internal email server 112 transmits the email message to the external email server 130, the external email server 130 may then attempt to deliver the email message to the destination email address. If the external email server 130 successfully delivers the email to the destination email address, it may take no further action. Though in some examples, the external email server 130 may transmit a message, such as a delivery confirmation message to the email server 112. However, if the external email server 130 is unable to deliver the email message to the destination email address, it may transmit a response email message to the company's email server 112. The company's email server 112 may then process the response email message.

Figure 3:
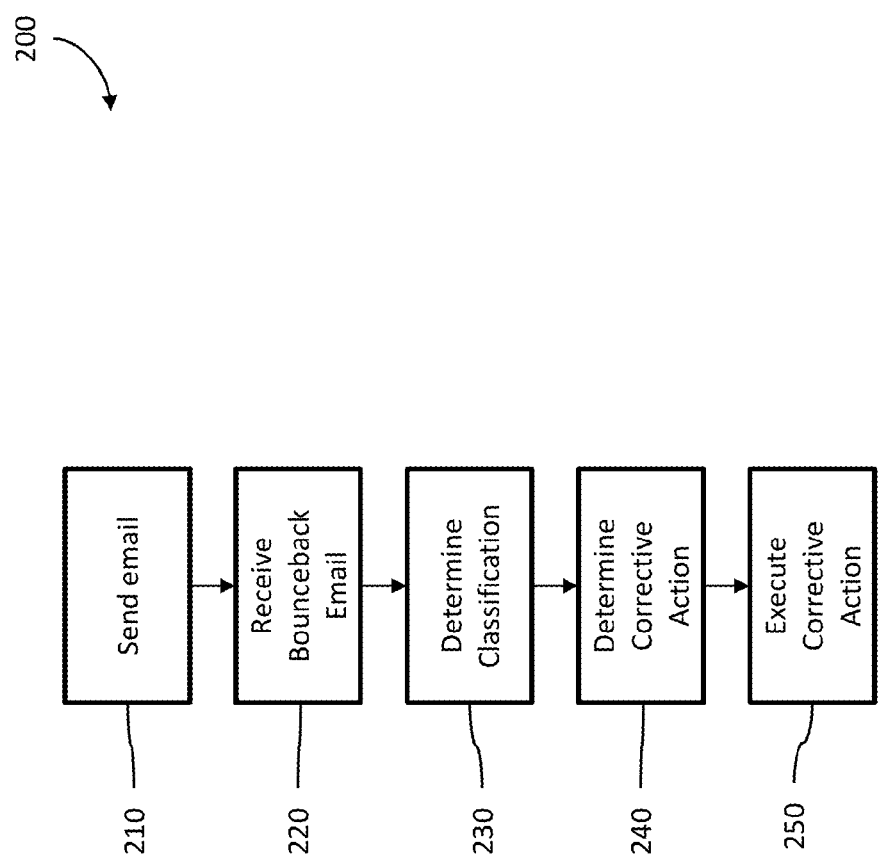
FIG. 3 shows an example of a method for processing email bounceback messages according to certain aspects.

Referring now to FIG. 3, FIG. 3 shows an example method 200 for processing email bounceback messages. The method 200 of FIG. 3 will be described with reference to the illustrative system 100 depicted in FIG. 1. However, the method of FIG. 3 is not limited to execution by such a system 100. Instead, it may be executed by any suitable processor-based system according to one or more examples. Further, the descriptions of particular components of the example shown in FIG. 1 performing particular steps, or portions of steps, of the method 200 of FIG. 3 are made for ease of reference for the reader, and are not intended to indicate that such a component or components necessarily performs the step(s) or portions of the step(s).

The method 200 begins in block 210 when, in this example, the email server 112 sends an email to an email address. The email server 112 in this example is associated with the domain "bank.com" and receives and sends emails destined for email addresses associated with the email server's domain as well as with email addresses associated with other domains. In the example shown in FIG. 1, the email server 112 receives an email to be sent and determines whether the destination email address is within the email server's domain or external to the email server's domain. If the destination email address is within the email server's domain, e.g., it is an internal email, the email server 112 may send the email to the email inbox associated with the destination email address. If the destination email address is external to the email server's domain, e.g., it is an external email, the email server 112 may send the email outside of the internal corporate network for delivery. After the email server 112 sends the email, the method 200 proceeds to block 220.

In block 220, in this example, the email server 112 receives a bounceback email. When the email server 112 receives the bounceback email, it determines that the email is a bounceback email, such as by analyzing portions of the email message.

An email message may contain different portions. For example, an email message may include a content portion and a header portion. In some examples, an email message may include only a header portion, having one or more fields, or only a content portion, or information such as metadata that may be used to determine whether the email is a bounceback message. For example, a bounceback message may contain information within a field of its header indicating that the email message is a bounceback message. In some examples, the email server 112 may analyze the contents of the email message. For example, a bounceback email message may include text within the body of the email indicating that the email message is a bounceback message.

Referring now to FIGS. 4-7, FIGS. 4-5 show example bounceback email messages. FIG. 4 shows a bounceback message 310 with information indicating that a previously-sent email was not delivered to the identified recipient. In this example, the content of the bounceback email includes information that can be used to determine the type of bounceback message. The bounceback message 310 includes a numeric code, referred to as a "delivery status notification" or DSN code 316, that corresponds to a pre-defined set of information. The DSN code 316 contained within the bounceback message 310 in FIG. 4 is shown as "550." In addition, the DSN code 316 has associated textual information 318, in this case the words "Invalid Recipient." Some example systems and methods may employ a DSN code 316, or associated textual information 318, or both, to determine a type of bounceback message 310. In the example shown in FIG. 4, the bounceback message 310 also includes additional information, including a destination email address 312, "jsmith@email-domain.com," a status message 314 indicating that the message was not delivered and delivery will not be attempted again, as well as some additional information. Examples may employ one or more of these types of information to determine that a message is a bounceback message, or a type of bounceback message.

FIG. 5 shows an example bounceback message 320. In the example shown in FIG. 5, the bounceback message 320 includes header information in one or more fields 322-326. In some examples, an email server 112 or bounceback processor 114 may analyze header information, such as information stored in one or more header fields or the type of header fields present, to determine whether a received email message is a bounceback message or a type of the bounceback message. In the example shown in FIG. 5, the header information includes a number of header fields. Three header fields 322-326 have been identified by the email server 112 or bounceback processor 114 as including information indicating that the message 320 is likely a bounceback message and the type of bounceback message. The first identified header field 322 indicates the sender of the email message. In this case, the sender 324 is identified as "Microsoft Outlook" and the sender email address 324 includes the term "MicrosoftExchange." In one example, an email server 112 or bounceback processor 114 analyzing the header information may determine that an email message is a bounceback message when an email message includes information indicating that the sender is an email server, such as Microsoft Exchange, rather than a user email account. In this case, the sender name of "Microsoft Outlook" appears to refer to an email program rather than a person's name, and the sender email address 324 includes "MicrosoftExchange," which indicates a type of email server software. Thus, the email server 112 or bounceback processor 114 in some examples may identify this message 320 as a bounceback message based on this information.

Some example systems or methods may also, or instead, analyze other fields of the message header, such as the "Subject" field 326. In this example, the "Subject" field of the message 320 includes the term "Undeliverable." In some examples, the email server 112 may identify the term "Undeliverable" in a "Subject" field and use that information to determine that a received message is a bounceback message. Further, some examples may employ some or all of fields 322-326 or a different field or fields or information.

Referring again to FIG. 3, in some examples, the email server 112 or bounceback processor 114 may also analyze and process reply messages sent from the destination email address. For example, a user may write and send an email message in response to an email received from the email server 112. However, in many cases, the email address associated with the email sent to the user is associated with a "do not reply" email address, which typically is not monitored by the sender. Such email addresses may be used to send automated notifications or information to which a reply is not requested or expected. However, sometimes recipients of such messages may reply anyway.

After determining that a received message is a bounceback message, the method 200 proceeds to block 230.

In block 230, in this example, the bounceback processor 114 determines a classification for the bounceback message. In some examples, the bounceback processor 114 may determine whether a bounceback message is a "hard bounce." In one example, a "hard bounce" refers to a reason associated with the sending of a bounceback message in which the original email message was not delivered and that delivery will not be retried. For example, if an invalid destination email address was supplied, a bounceback message may indicate that the email message could not be delivered. The bounceback processor 114 may determine that a bounceback message associated with an invalid destination email address is classified as a hard bounce. In some examples, the bounceback processor 114 may determine that a bounceback message is a hard bounce for other reasons.

For example, a hard bounce classification may be associated with an invalid email address, an invalid or missing username, an invalid or missing domain name, a network outage or failure, or an email server outage or failure. In some examples, a hard bounce classification may be associated with a permanent delivery failure of a particular email message. For example, initial delivery of an email message may fail, however, delivery may be retried one or more times. Thus, the initial delivery failure may not be classified as a hard bounce, however, a delivery failure after all retries have been attempted may be classified as a hard bounce. In some examples, a hard bounce may be determined after a predetermined number of "soft bounces," which are described in more detail below. For example, if five "soft bounces" are received for a destination email address, the fifth soft bounce message may be classified as a hard bounce even though the fifth bounce itself would not ordinarily be classified as a hard bounce.

Figure 6:
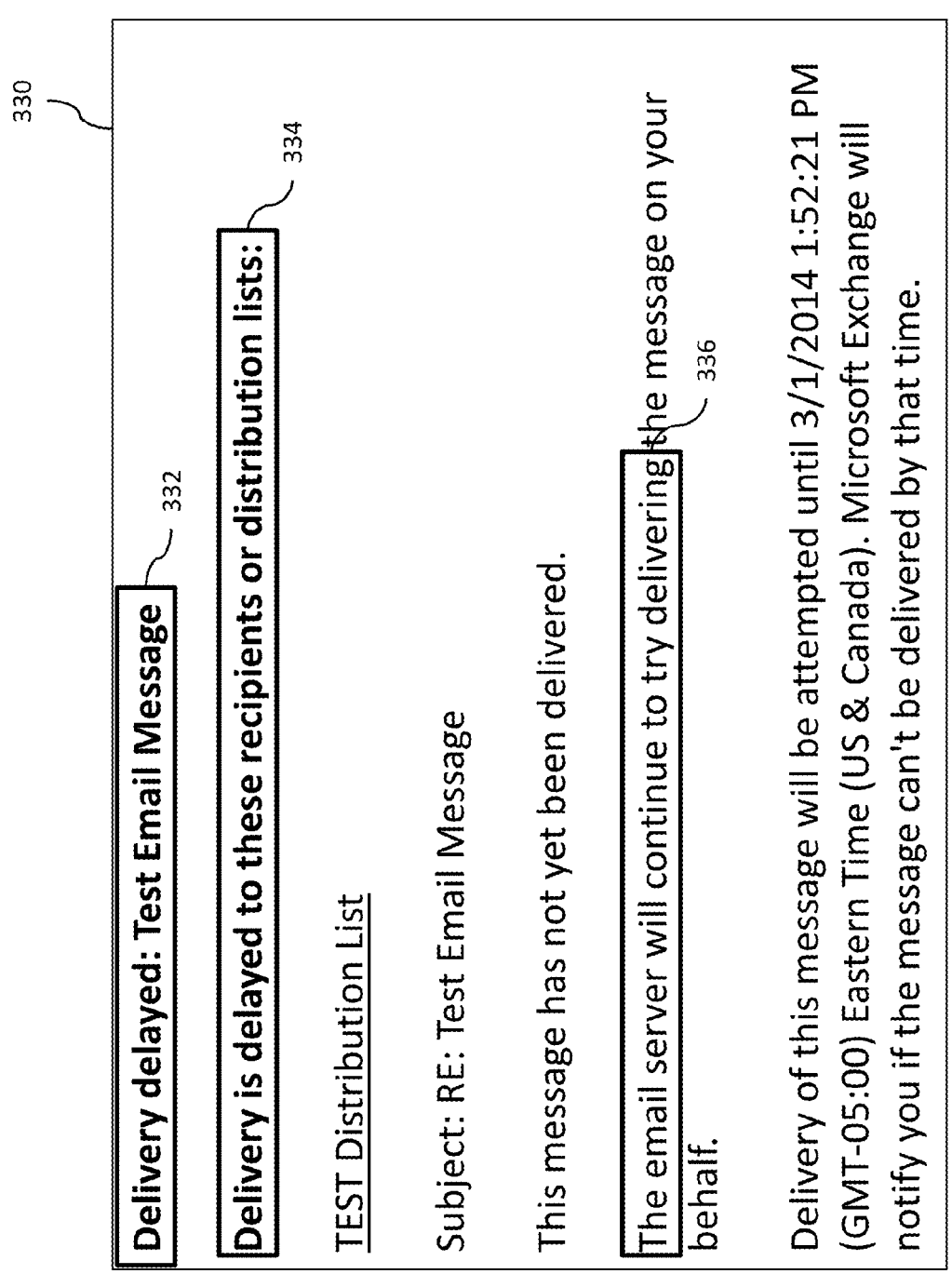

The bounceback processor 114 may determine whether a bounceback message is a "soft bounce." In one example, a "soft bounce" refers to a reason associated with the sending of a bounceback message in which the original email message either was not yet delivered, but that delivery is being re-tried, or that the original email message was delivered and a reply message to the original email message was received. For example, sometimes during transmission of an email message to a recipient, a destination email server or domain may be malfunctioning or temporarily unavailable. Thus, a valid destination email address may have been provided, however, a service interruption is temporarily preventing delivery. In such a case, a bounceback message may be sent to the bounceback processor 114 indicating the delayed delivery or of the delivery problems. FIG. 6 shows an example bounceback message 330. The bounceback message 330 includes content indicating that delivery of an email message has been delayed. For example, the bounceback message includes a field 330 indicating "Delivery delayed" along with the subject of the original email message, "Test email message."

As discussed above, bounceback processor 114 may analyze the response message to determine if the email message is a bounceback message and, after determining the email message is a bounceback message, determining a classification for the bounceback message. In one example, the bounceback processor 114 analyzes the content of the email message 330 of FIG. 6 and identifies one or more fields 332-336 that provide indications that the email message 330 is a bounceback message. The first field 332 indicates that delivery has been delayed. The second field 334 indicates one or more email addresses to which delivery has been delayed. The third field 336 indicates that delivery is being retried. Thus, the bounceback processor 114 may analyze one or more of such fields to determine that the email message 330 is a bounceback message and that the bounceback message 330 is a soft bounce.

Figure 7:
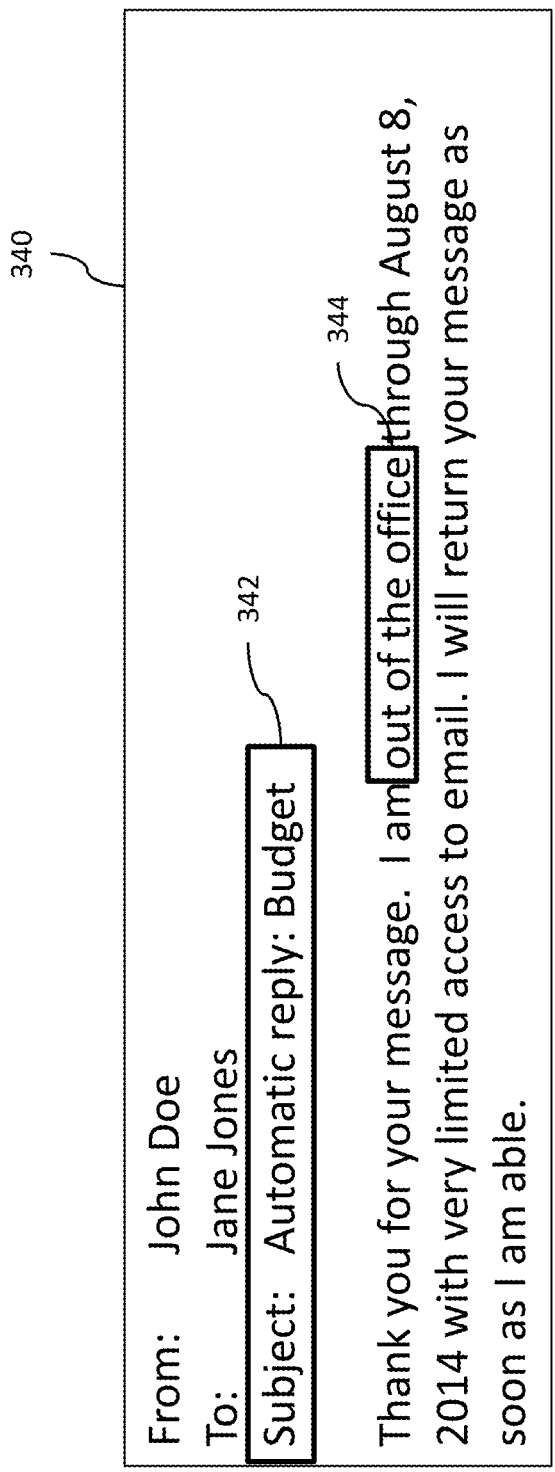

Referring now to FIG. 7, FIG. 7 shows one example of bounceback message 340. The bounceback processor 114 may receive the bounceback message 340 and analyze the message to determine that the message is a bounceback message, and then determine a classification for the bounceback message. In this example, the bounceback processor 114 analyzes the subject field 342 of the bounceback message and determines that the bounceback message is an automatic reply message. In addition, the bounceback processor 114 analyzes the content of the bounceback message for predefined messages or character strings and identifies the string "out of office" 340. The bounceback processor 114 then determines that the bounceback message is classified as an "out of office" message. In some examples, "out of office" messages may be separately classified from other messages, but in some examples, "out of office" messages may be classified as "soft bounce" bounceback messages.

As discussed above, in some examples, the bounceback processor 114 may also analyze and process reply messages sent from the destination email address, such as by the owner of the destination email address. For example, a user may write and send an email message in response to an email received from the email server 112. And while such emails may not be automatically-generated bounceback messages, they may be classified as well. For example, a company that sends information to its customers may configure a bounceback processor 114 to classify such user emails as "reply emails" or as "user-generated emails." In some cases, the bounceback processor 114 may use a general category of "unknown email message" when it is unable to otherwise classify a received bounceback message. In one such example, a user-generated email sent to a "do not reply" address may be classified as an unknown email message.

In the examples discussed above, the bounceback processor 114 has been described as performing the step of block 230. To obtain a bounceback message or information associated with a bounceback message, in some examples the email server 112 may transmit an identified bounceback message to the bounceback processor 114. In one such example, the bounceback processor 114 receives the bounceback message from the email server 112 and determines the classification of the bounceback message. In some examples, incoming email may be automatically routed to the bounceback processor 114, which may then determine whether a received email is a bounceback email, as described above with respect to block 220, or determine a classification for the bounceback email, as described above with respect to block 230, or both. In some examples, email messages may be stored in a data store 118 and bounceback messages may be flagged, segregated, or otherwise identified as bounceback messages. In one such example, the bounceback processor 114 may poll the data store 118 for new bounceback messages to classify. In some examples, the bounceback processor 114 may receive a notification, such as from the email server 112, when a new bounceback message has been received and stored in the data store 118.

After determining a classification for a bounceback message, the method 200 proceeds to block 240.

In block 240, in this example, the bounceback processor 114 determines a corrective action based on the classification. As discussed above, bounceback messages may be classified in different ways. For example, bounceback messages may be classified as hard bounces, soft bounces, out of office bounces, network, and unknown messages. The bounceback processor 114 may determine that a destination email address associated with a hard bounce message should be immediately suspended or that it may be blocked indefinitely. Such hard bounces may trigger an immediate suspension of a destination email address because it may indicate a permanent problem with the destination email address, such as an invalid address (e.g., due to a misspelling or to an associated email account being closed). It may also be due to an invalid domain, which could be due to a misspelling or the domain being inactive or shut down. Such conditions may not be likely to correct themselves in the short term, and thus in some examples, the bounceback processor 114 may determine that the appropriate corrective action is to indefinitely suspend email addresses associated with a hard bounce message.

In some examples, the bounceback processor 114 may permanently suspend an email address if a user has attempted to use the email address more than a predetermined threshold number of times, and each attempted use has resulted in a hard bounce. For example, if a user enters an email address and it generates a hard bounce, the bounceback processor 114 may immediately suspend the email address, but give the user the option to retry the email address or to correct the email address. If the user attempts to correct the email address, or otherwise confirms that the email address is correct, the bounceback processor 114 may remove the suspension. However, if the email address again triggers a hard bounce, the bounceback processor 114 may again immediately suspend the email address. In some examples, the user may be given a limited number of opportunities to correct or confirm an email address before the bounceback processor 114 permanently blocks the email address from use.

However, in some examples, the bounceback processor 114 may not immediate suspend the destination email address. For example, a network or server issue may result in hard bounceback message. Thus, in some cases, the bounceback processor 114 may further classify hard bounce messages based on whether an email transmission to the destination email address has previously been successful. If prior email messages have been sent to the destination email address without resulting in a hard bounce message, the bounceback processor 114 may determine that the hard bounce represents a temporary condition, such as a failure of an external email server 130. In one such example, the bounceback processor 114 may delay further email messages to the destination email addresses by a predefined or dynamically determined time period to allow for corrective action at the external email server 130 or domain. However, in one example, if this is a first attempt to send email messages to a destination email address and a hard bounce is received, the bounceback processor 114 may determine that the destination email address is invalid and immediately suspend the destination email address indefinitely.

In some examples, the bounceback processor 114 may allow for one or hard bounce messages to a new email address. For example, in some cases, new email addresses may not be setup correctly or may require user confirmation to activate the email address. Thus, if a user fails to confirm activation of the email address, emails sent to the email address may fail with a responsive hard bounce message. Thus, in some examples, the bounceback processor 114 may allow a small number of initial failures of an email address, such as a new email address, over a period of time. In one example, the bounceback processor 114 may allow up to three hard bounce messages in a thirty-day period for an email address. Such an allowance may enable a user to properly establish an email address, or may be the result of a configuration problem with the email server itself. Thus, in some examples, the bounceback processor 114 may employ predefinable threshold numbers of hard bounceback messages over a time period during which an email address may not be suspended.

In one example, responsive to determining bounceback message is a soft bounce, or in some cases a hard bounce, the bounceback processor 114 may establish or increment a counter associated with a destination email address for the bounceback message. The bounceback processor 114 may then compare the counter with a predefined threshold. If the counter equals or exceeds the predefined threshold, the bounceback processor 114 may temporarily suspend the destination email address for predetermined period of time, such as a week. In some examples, the predefined threshold may be a numeric value to indicate a maximum number of allowed soft bounce or hard bounce messages. In some examples, the predefined threshold may be a time-limited numeric value. For example, a predefined threshold may specify a numeric value, e.g., 10, and may specific a period of time, e.g., a week, during which the numeric threshold must be reached before corrective action is taken. Thus, if the bounceback processor 114 processes 12 bounceback messages for a destination email address, but the bounceback messages arrive over a period of two weeks, the bounceback processor 114 may not take corrective action. In some examples, a time-limited predefined threshold may be a rolling time period, while in some examples, a time-limited predefined threshold may be a fixed time period.

For example, a predefined threshold may be a fixed time period of one week. In this example, the bounceback processor 114, after classifying a bounceback message as a soft bounce, determines if a predefined threshold for a destination email address is active. If the predefined threshold is not active, the bounceback processor 114 sets the predefined threshold as active, begins a one-week period, sets the numeric value of the predefined threshold to 10, and increments a counter associated with destination email address. Over the course of the next week, each time the bounceback processor 114 classifies a bounceback message associated with the destination email address as a soft bounce, the bounceback processor 114 increments the counter. If the counter reaches the numeric threshold before the expiration of the one-week period, the bounceback processor 114 may determine that the appropriate corrective action is to suspend the destination email address for a period of time. In some examples, the period of time may be fixed, while in some examples, it may be indefinite.

Further, in some examples, the bounceback processor 114 may maintain a further counter and further predefined threshold to track the number of suspensions of the destination email address. In one such example, the bounceback processor 114 may determine that the appropriate corrective action is to temporarily suspend a destination email address until the further counter meets or exceeds the further predefined threshold, after which, the bounceback processor 114 may determine that the appropriate corrective action is to indefinitely suspend the destination email address.

In some examples, the bounceback processor 114 may take corrective action based on out of office bounces. In one example, the bounceback processor 114 may ignore out of office bounces and may determine that no corrective action is to be taken. For example, such out of office messages typically do not indicate a problem with the destination email address, but only that the intended recipient may not be checking the email address. However, in some examples, the bounceback processor 114 may temporarily suspend the destination email address. For example, the bounceback processor 114 may have classified the bounceback message as an out of office bounce, but may have identified a time period during which the intended recipient will be away, such as by analyzing the content of the out of office bounced message. In one example, the bounceback processor 114 may suspend the destination email address for a corresponding time period. In another example, the bounceback processor 114 may determine that the out of office bounce message indicates that the intended recipient is no longer associated with the email address. For example, if the intended recipient has left her employment, her employer may still maintain the email address for a period of time, but establish an out of office message indicating her departure. The bounceback processor 114 may determine that the appropriate corrective action is to suspend the destination email address indefinitely based upon an analysis of the content of the bounceback message.

In some examples, the bounceback processor 114 may determine corrective action based upon bounceback messages associated with an email domain rather than a single destination email address. For example, a company may send multiple emails per day, but only one email per customer. If multiple customers have email addresses associated with the same domain, and the domain's email server is experiencing a problem, each of the emails sent to the customers at that domain may trigger a soft or hard bounceback message. Thus, in some examples, the bounceback processor 114 maintains one or more thresholds associated with an email domain. For example, the bounceback processor 114 increments a counter for each bounceback message received from a domain. If the counter meets or exceeds the established threshold, the bounceback processor 114 may determine that a corrective action is to suspend the email domain, rather than individual destination email addresses.

In some examples, the bounceback processor 114 may further determine that the corrective action should include a notification to the administrator of the email server 112 to indicate that an external email domain may have an issue and a suggestion to contact an administrator for the external email domain. In some examples, the bounceback processor 114 may receive soft or hard bounceback messages from an email domain based on a volume of email traffic to the email domain. The email domain may monitor incoming email traffic and filter incoming emails as potential email "spam" messages. Thus, in some examples by determining that corrective action includes a notification to the administrator of the internal email server 112, the administrator may contact the email domain to ensure that the emails are not filtered as spam and to ensure a free-flow of emails to the email domain.

As discussed above, in some examples, the bounceback processor 114 may receive a message of unknown type. In one example, the bounceback processor 114 may generate a notification for a user of the bounceback processor 114 to indicate that an unknown message was received. In this example, the notification includes summary information about the email message, such as the email address, the domain, any DSN code(s) received, and a link to access the email message itself. The bounceback processor 114 may then receive user input indicating a classification for the message, such as whether the message should be treated as a hard bounce, a soft bounce, or a message to be ignored. The bounceback processor 114 may then use the received classification from the user to determine appropriate corrective action as discussed above. In addition, in some examples, the bounceback processor 114 may store information about the received message to be used when processing future messages. For example, if a DSN code was provided with the message, the bounceback processor 114 may generate a data record associated with the DSN code such that the DSN code will be processed in accordance with the received user classification for future bounceback messages 114 having the same DSN code.

In some examples, the bounceback processor 114 may also determine a corrective action based upon another determined corrective action. For example, as described above, in some examples, the bounceback processor 114 may determine that corrective action includes suspending a destination email address for a period of time or indefinitely. Or in some examples, the corrective action may be to increment a counter, but not to suspend a destination email address. In addition, the bounceback processor 114, may determine that corrective action should include providing a notification to a customer associated with a destination email address.

For example, if the internal email system 110 is associated with a bank, the bank may maintain customer accounts associated with destination email addresses. In one example, the bank may provide certain online customer services via a website, such as managing bank accounts, paying bills, etc., which its customers may access periodically. In one example, the bank may provide notifications through such a website. For example, if the bank has received three soft bounce messages for a customer's email address, the bounceback processor 114 may determine that a notification should be presented on the bank's online website when the customer next accesses the website. The notification may indicate that several soft bounces have been received and that the customer should attempt to resolve the error, and that the customer's email address may be temporarily suspended.

Figure 8:
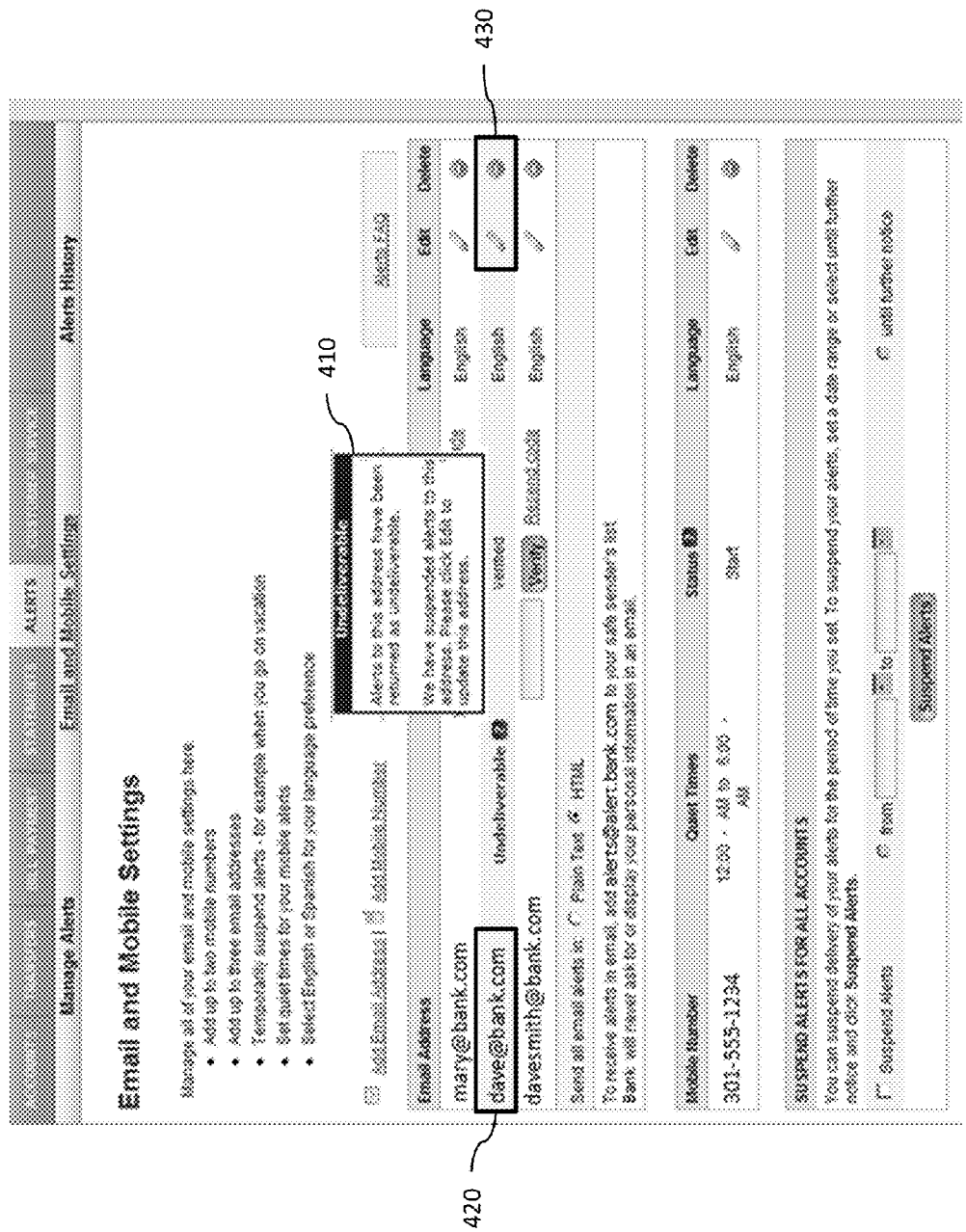
FIGS. 8-9 show examples of customer notification according to certain aspects.
Figure 9:

In some examples, if a customer's email address is suspended, the bounceback processor 114 may determine that corrective action includes providing a notification to the customer via the website, but also includes a requirement that the customer provide a new email address. For example, FIG. 8 shows an example customer notification 410. The web page indicates that the email address 420 dave@bank.com has been suspended. The customer notification 410 includes a message indicating that emails sent to the email address 420 were returned as undeliverable and that the email address 420 has been suspended. The website also provides options 430 to edit or delete the email address. FIG. 9 shows another example of customer notification indicating multiple email addresses, two of which have been suspended.

In some examples, the bounceback processor 114 may determine that a corrective action includes a notification to be transmitted to a customer associated with the destination email address by an alternate communications path. As discussed above, in one example, the bounceback processor 114 may determine that a notification is to be provided to a customer when he or she next accesses the website. In some examples, the bounceback processor 114 may determine that a notification is to be sent using a different communications path, either in addition to a notification on the website or instead of such a notification. For example, the bounceback processor 114 may analyze information associated with the customer stored in data store 118. Based on such information, in one example, the bounceback processor 114 may determine a corrective action is to send an email message to an alternate email address. In one example, the bounceback processor 114 may determine a corrective action is to send a text message, a short message service (SMS) message, or a multimedia message service (MMS) message to the customer. In some examples, a system may enable other communication paths to a user, such as via secure private messaging on a website. Or in some examples, the bounceback processor 114 may determine that a customer service department is to be notified to directly contact the customer, such as by telephone.

After the bounceback processor 114 has determined a corrective action, the method 200 proceeds to block 250.

At block 250, the bounceback processor 114 executes the corrective action. For example, in some examples, a corrective action may include a suspension of a destination email address. In one such an example, the bounceback processor 114 may store an indication that a destination email address is suspended. The data store 118 may include destination email addresses for one or more customers. The bounceback processor 114 may store a flag or other indication associated with the destination email address to indicate that the destination email address has been suspended. In some examples, the indication may be an end date of the suspension, or a value to indicate an indefinite suspension. In some examples, the indication causes the email server 112 to not send emails to a destination email address.

As discussed above, in some examples, the bounceback processor 114 may determine that an email domain should be temporarily or permanently suspended. In one example, the bounceback processor 114 may store an indication associated with an email domain, wherein the indication causes the email server 112 to not send emails to the email domain.

In some examples, a corrective action may include incrementing a counter. In one example, the data store 118 may store one or more counters associated with one or more destination email addresses. The bounceback processor 114 may increment or otherwise change or store one or more counter values in the data store 118.

In some examples, the bounceback processor 114 may also generate and store one or more notifications to be communicated to a customer. For example, as discussed above, in some examples, a customer may be notified of an issue with or suspension of an email address associated with the customer. In one example, bounceback processor 114 generates one or more messages to be communicated to the customer. As discussed above, in some examples, a corrective action includes sending an email message to an alternate email address, a text message, an SMS message, an MMS message, or a customer service phone call to the customer. In some examples, a notification may be generated and presented to a customer when he or she next accesses a website associated with an account held by the customer, or the bounceback processor 114 may generate a suitable notification and cause the notification to be transmitted to the customer.

After the method 200 has executed a corrective action, the method 200 completes. In some examples, the method 200 may return to block 210 to process one or more additional bounceback messages.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as programmable logic controllers (PLCs), programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Examples of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one example" or "an example" means that a particular feature, structure, operation, or other characteristic described in connection with the example may be included in at least one implementation of the invention. The invention is not restricted to the particular examples described as such. The appearance of the phrase "in one example" or "in an example" in various places in the specification does not necessarily refer to the same example. Any particular feature, structure, operation, or other characteristic described in this specification in relation to "one example" may be combined with other features, structures, operations, or other characteristics described in respect of any other example.

That which is claimed is:

1. A computer-implemented method, comprising:
receiving a bounceback email message from a communications network; and
determining, by analyzing the bounceback email message, both (i) a corrective action for a particular email address associated with the bounceback email message and (ii) an action for other email addresses of a domain associated with the bounceback email message; and
notifying the intended recipient about the bounceback email message via a secondary channel that is different than through an email transmission server,
wherein determining the corrective action for the particular email address comprises:
determining a classification for the bounceback email message;
determining the corrective action based on the classification; and
executing the corrective action by outputting a command to the email transmission server to suspend transmission of further email messages to the particular email address associated with the bounceback email message or to temporarily suspend transmission of further email messages to the particular email address associated with the bounceback email message;
wherein determining the action for other email addresses of the domain comprises:
determining a problem with a network or a server associated with the domain for the bounceback email message by tracking the domain associated with the bounceback email message; and
responsive to determining the problem, outputting a command to the email transmission server to suspend further email messages from being sent to the domain, the further email messages being for intended recipients other than the intended recipient of an email message to which the bounceback email message is a response.

2. The computer-implemented method of claim 1, wherein the classification comprises a hard bounce, and wherein the corrective action comprises suspending the particular email address associated with the bounceback email message such that transmission of further email messages to the particular email message is suspended.

3. The computer-implemented method of claim 1, wherein the classification comprises a soft bounce.

4. The computer-implemented method of claim 3, further comprising, responsive to determining the classification:
incrementing a hard bounce counter;
comparing the hard bounce counter to a hard bounce threshold; and
responsive to the hard bounce counter exceeding the hard bounce threshold, suspending transmission of emails to the particular email address associated with the bounceback email message.

5. The computer-implemented method of claim 3, further comprising, responsive to determining the classification:
incrementing a soft bounce counter;
comparing the soft bounce counter to a soft bounce threshold; and
responsive to the soft bounce counter exceeding the soft bounce threshold, suspending transmission of emails to the domain associated with the bounceback email message.

6. The computer-implemented method of claim 3, further comprising, responsive to determining the classification:
incrementing a soft bounce counter;
comparing the soft bounce counter to a soft bounce threshold; and
responsive to the soft bounce counter exceeding the soft bounce threshold, temporarily suspending transmission of emails to the particular email address associated with the bounceback message.

7. The computer-implemented method of claim 6, further comprising providing a notification within a web account associated with the particular email address.

8. The computer-implemented method of claim 1, wherein the classification comprises an auto-reply message, and wherein the corrective action comprises deleting the bounceback email message.

9. The computer-implemented method of claim 1, wherein determining the classification comprises analyzing a delivery status notification (DSN) code associated with the bounceback email message.

10. The computer-implemented method of claim 9 wherein analyzing further comprises comparing the DSN code received with previous DSN codes received from a domain associated with the bounceback email message.

11. The computer-implemented method of claim 1, further comprising notifying, by a computing device, an administrator.

12. A system, comprising:
one or more processor-based servers configured to receive email messages;
one or more of the processor-based servers configured to determine bounceback email messages based on received email messages and to determine, by analyzing the bounceback email message, both (i) a corrective action for a particular email address associated with the bounceback email message and (ii) an action for other email addresses of a domain associated with the bounceback email message by determining a problem with a network or a server associated with the domain for the bounceback email message by tracking the domain associated with the bounceback email message; and
one or more of the processor-based servers configured to take corrective action based on the determined bounceback email messages by:
suspending transmission of further email messages to the particular email address associated with the bounceback email message or temporarily suspending transmission of further email messages to the particular email address associated with the bounceback email message; and
suspending further email messages from being sent to the domain, the further email messages being for intended recipients other than the intended recipient of an email message to which the bounceback email message is a response,
wherein one or more of the processor-based servers is configured to notify the intended recipient about the bounceback email message via a secondary channel that is different than a channel that includes the particular email address.

13. The system of claim 12, further comprising at least two processor-based servers, wherein one of the processor-based servers comprises an email server and a second of the processor-based servers comprises a bounceback processor.

14. The system of claim 12, further comprising a data store configured to store one or more email messages.

15. The system of claim 14, wherein the data store is further configured to store one or more flags, the flags being associated with one or more destination email addresses or one or more email domains and configured to indicate a suspension of a corresponding destination email address or email domain.

16. The system of claim 12, wherein one or more of the processor-based servers is configured to classify bounceback email messages, and wherein the one or more servers configured to take corrective action is further configured to take corrective action based on classifications of the bounceback email messages.

17. A non-transitory computer-readable medium comprising program code configured to a cause a processor to perform a method, the program code comprising:
   program code for receiving a bounceback email message;
   program code for determining, by analyzing the bounceback email message, both (i) a corrective action for a particular email address associated with the bounceback email message and (ii) an action for other email addresses of a domain associated with the bouncemail email message; and
   program code for notifying the intended recipient about the bounceback email message via a secondary channel that is different than through an email transmission server,
   wherein program code for determining the corrective action for the particular email address comprises:
      program code for determining a classification for the bounceback email message;
      program code for determining the corrective action based on the classification; and
      program code for executing the corrective action by outputting a command to the email transmission server to suspend transmission of further email messages to the particular email address associated with the bounceback email message or to temporarily suspend transmission of further email messages to the particular email address associated with the bounceback email message;
   wherein program code for determining the action for other email addresses of the domain comprises:
      program code for determining a problem with a network or a server associated with the domain for the bounceback email message by tracking the domain associated with the bounceback email message; and
      program code for, responsive to determining the problem, outputting a command to the email transmission server to suspend further email messages from being sent to the domain, the further email messages being for intended recipients other than the intended recipient of an email message to which the bounceback email message is a response.

18. The non-transitory computer-readable medium of claim 17, further comprising:
   program code for storing one or more flags in a data store, the flags being associated with one or more destination email addresses or one or more email domains and configured to indicate a suspension of a corresponding destination email address or email domain.

19. The non-transitory computer-readable medium of claim 17, wherein the program code for executing the corrective action comprises program code for temporarily suspending the particular email address associated with the bounceback email message.

20. The non-transitory computer-readable medium of claim 17, wherein the program code for executing the corrective action comprises program code for permanently suspending the particular email address associated with the bounceback email message.

21. The non-transitory computer-readable medium of claim 17, wherein the program code for executing the corrective action comprises program code for temporarily suspending the domain associated with the bounceback email message.

22. The computer-implemented method of claim 1, wherein notifying the intended recipient about the bounceback email message via the secondary channel that is different than through the email transmission server comprises:
   sending a text message, a short message service message, or a multimedia message service message to the intended recipient via a telecommunications network; or
   outputting an instruction to call the intended recipient via a telephone.

23. The system of claim 12, wherein one or more of the processor-based servers is configured to notify the intended recipient about the bounceback email message via the secondary channel that is different than the channel that includes the particular email address by being configured for:
   sending a text message, a short message service message, or an multimedia message service message to the intended recipient via a telecommunications network; or
   outputting an instruction to call the intended recipient via a telephone.

* * * * *